US011326542B2

(12) United States Patent
Green

(10) Patent No.: US 11,326,542 B2
(45) Date of Patent: May 10, 2022

(54) ENGINE MONITORING APPARATUS

(71) Applicant: Perkins Engines Company Limited, Peterborough (GB)

(72) Inventor: Christopher J. Green, Peterborough (GB)

(73) Assignee: Perkins Engines Company Limited, Peterborough (GB)

(*) Notice: Subject to any disclaimer, the term of this patent is extended or adjusted under 35 U.S.C. 154(b) by 201 days.

(21) Appl. No.: 16/622,764

(22) PCT Filed: Jun. 28, 2018

(86) PCT No.: PCT/EP2018/000329
§ 371 (c)(1),
(2) Date: Dec. 13, 2019

(87) PCT Pub. No.: WO2019/001773
PCT Pub. Date: Jan. 3, 2019

(65) Prior Publication Data
US 2021/0148300 A1    May 20, 2021

(30) Foreign Application Priority Data

Jun. 29, 2017    (GB) ..................................... 1710456

(51) Int. Cl.
*F02D 41/28*    (2006.01)
*G07C 5/00*    (2006.01)
(Continued)

(52) U.S. Cl.
CPC ......... *F02D 41/28* (2013.01); *F02D 41/0097* (2013.01); *G01H 3/04* (2013.01);
(Continued)

(58) Field of Classification Search
CPC ................ F02D 41/28; F02D 41/0097; F02D 2041/288; F02D 2200/024;
(Continued)

(56) References Cited

U.S. PATENT DOCUMENTS

| 4,189,940 A | 2/1980 | Hulls et al. |
| 6,212,944 B1 | 4/2001 | Kwun et al. |

(Continued)

FOREIGN PATENT DOCUMENTS

| DE | 102004036443 A1 | 3/2006 |
| EP | 0724159 A1 | 7/1996 |

(Continued)

OTHER PUBLICATIONS

International Search Report for related International Application No. PCT/EP2018/000329; report dated Oct. 23, 2018.
United Kingdom Search Report for related GB Application No. 1710456.3 report dated Dec. 14, 2017.

*Primary Examiner* — Sizo B Vilakazi

(57) ABSTRACT

A method of monitoring the usage of an internal combustion engine comprises performing an engine monitoring routine using a local monitoring device attached to an internal combustion engine. The engine monitoring routine includes generating data representative of a plurality of vibrations of an internal combustion engine using a vibration sensor of the local monitoring device, processing the generated data to determine a first value representative of a firing frequency of the internal combustion engine, generating an aggregated summary based on the first value and transmitting the aggregated summary and identification data for the local monitoring device to a remote application. The remote application processes the transmitted aggregated summary based on the identification data to determine engine speed usage data.

16 Claims, 10 Drawing Sheets

(51) Int. Cl.
*G07C 5/08* (2006.01)
*F02D 41/00* (2006.01)
*G01H 3/04* (2006.01)
*G01M 15/04* (2006.01)
*G01M 15/12* (2006.01)

(52) U.S. Cl.
CPC .......... *G01M 15/046* (2013.01); *G01M 15/12* (2013.01); *G07C 5/008* (2013.01); *G07C 5/0808* (2013.01); *F02D 2041/288* (2013.01); *F02D 2200/024* (2013.01)

(58) Field of Classification Search
CPC ..... F02D 2200/025; F02D 41/22; G01H 3/04; G01M 15/046; G01M 15/12; G07C 5/008; G07C 5/0808; Y02T 10/40; F01M 11/04; F01M 2011/0491
See application file for complete search history.

(56) References Cited

U.S. PATENT DOCUMENTS

| | | | |
|---|---|---|---|
| 6,567,709 | B1 | 5/2003 | Malm et al. |
| 9,447,745 | B2 | 9/2016 | Worden et al. |
| 9,523,298 | B2 | 12/2016 | Ross et al. |
| 10,777,027 | B2 * | 9/2020 | Oda .................. H04L 67/12 |
| 2008/0053405 | A1 | 3/2008 | Vigild et al. |
| 2013/0298652 | A1 * | 11/2013 | Gillette, II ............ F02B 77/085 73/114.01 |
| 2016/0319762 | A1 | 11/2016 | Honl et al. |
| 2017/0040520 | A1 | 2/2017 | Gillette |
| 2017/0083874 | A1 | 3/2017 | Hoover et al. |

FOREIGN PATENT DOCUMENTS

| | | |
|---|---|---|
| EP | 2993116 A1 | 3/2016 |
| JP | 2011-209010 A | 10/2011 |
| WO | WO 1984/000417 A1 | 2/1984 |

* cited by examiner

ENGINE MONITORING APPARATUS

CROSS-REFERENCE TO RELATED APPLICATION

This Application is a 35 USC § 371 US National Stage filing of International Application No. PCT/EP2018/000329 filed on Jun. 28, 2018 which claims priority under the Paris Convention to United Kingdom Patent Application No. 1710456.3 filed on Jun. 29, 2017.

TECHNICAL FIELD

The present disclosure relates to methods and apparatus for monitoring the performance of an internal combustion engine. For example, the present disclosure relates to smart devices for monitoring the performance of an internal combustion engine and transmitting engine data to a remote device.

BACKGROUND

Physical objects and/or devices are increasingly provided with the capability to be networked together. Often referred to as the "Internet of Things", the ability for objects and/or devices to be uniquely identified and integrated into a communication network allows for additional functionality to be provided. Typically, such networked devices/objects are referred to as "smart" devices/objects.

For example, everyday objects/devices may include a module which monitors the performance/operation of the device and a module which communicates information regarding the performance/operation of the device over a network (i.e. the internet) to a remote device/object. Alternatively, a network connection between device/objects may be used to remotely send instructions and/or control signals to an interconnected device/object.

Typically, a smart device/object communicates with a remote device/object over a network. For example, a remote device to which a "smart" devices/object may connect to may be a server, a smart phone app or another "smart" device. Further, the network connection between the devices may be provided by, for example, an internet connection, a wireless internet connection (WiFi), a Bluetooth connection, a mobile internet connection or a combination of the above.

Often, incorporating "smart" functionality into devices/objects requires special design considerations. The module for performing the monitoring and communication may require a power source and/or a means of communicating over a network. Accordingly, devices/objects are often specially designed to incorporate smart features. As such, incorporating smart features into existing devices is often challenging.

In particular, "smart" functionality is increasingly being incorporated into machines in order to provide improved monitoring of such machines.

One known type of device for monitoring a machine is an engine data logger. Engine data loggers may be used to monitor various engine parameters over time, such as engine speed. Monitoring engine speed over time may help with analysis of various aspects of the engine and its use, for example how a machine operator is typically using the machine's engine, what likely engine wear may be, etc.

Existing engine data loggers tend to be large and costly, either requiring an interface to a Control Area Network (CAN) bus in order to obtain a reading of the current engine speed from an Engine Control Unit (ECU), or requiring additional measurement equipment (such as mechanical, magnetic or laser tachometers, or fuel measurement equipment). Establishing an interface to the CAN bus may be difficult and time consuming, and providing additional measurement equipment may be costly and inconvenient.

Some existing engine data loggers may be configured to establish an internet connection with a server, where engine speed measurements may be stored over time and/or analysed. Establishing such connections can be costly, inconvenient and potentially unreliable, for example when the machine is located at the geographical limits of an internet network (for example, at the geographical limits of a Radio Access Network (RAN) cell, or at the geographical limits of a WiFi network area, etc).

Furthermore, it may also be desirable to obtain data in relation to a legacy machine that does not have appropriate inbuilt sensing and/or communications functionality. Accordingly, it may be desirable to attach such sensing functionality to an engine retrospectively. There may be a desire to achieve the functionality with maximum ease and minimum downtime.

SUMMARY

A first aspect of the present disclosure provides a method of monitoring the usage of an internal combustion engine. The method comprises performing an engine monitoring routine using a local monitoring device attached to an internal combustion engine. The engine monitoring routine generates data representative of a plurality of vibrations of an internal combustion engine using a vibration sensor of the local monitoring device. The engine monitoring routine then processes the generated data to determine a first value representative of a firing frequency of the internal combustion engine and generates an aggregated summary based on the first value. The engine monitoring routine transmits the aggregated summary and identification data for the local monitoring device to a remote application. The method also comprises the remote application processing the transmitted aggregated summary based on the identification data to determine engine speed usage data.

Advantageously, by processing of the aggregated summary using a remote application, the local monitoring device is not required to store data relating to the internal combustion engine. For example, the local monitoring device does not need to store engine characterising data such as the number of cylinders in the internal combustion engine or the number of combustion events per revolution of the engine. Rather, this engine characterising data can be stored in the remote application where it is associated with the identification data of the monitoring device. Thus, according to the method of this disclosure the local monitoring device does not require initialisation in order to begin monitoring the usage of an internal combustion engine. Accordingly, local monitoring devices for performing the engine monitoring routine of this disclosure may be quickly and easily installed on an internal combustion engine.

Furthermore, the local monitoring device of this disclosure is directly attached to the internal combustion engine and vibrates in unison with the internal combustion engine. As such, the vibrations recorded by the vibration sensor are a direct representation of the internal combustion engine operation, and may not be subject to external vibrations from other sources. Accordingly, the method of monitoring according to the present invention provides a highly accurate stream of data for monitoring the usage of the internal combustion engine.

According to a second aspect of this disclosure a computer program comprising instructions to cause a local monitoring device and a remote device running a remote application to execute the steps of the method of the first aspect is provided.

According to a third aspect of this disclosure computer-readable media having stored thereon the computer program according to the second aspect is provided.

BRIEF DESCRIPTION OF THE DRAWINGS

Embodiments of the disclosure will now be described, by way of example only, with reference to the accompanying drawings in which.

DETAILED DESCRIPTION

According to this disclosure, a local monitoring device and a remote application may be provided for monitoring the usage of an internal combustion engine. For example, the method of monitoring according to this disclosure may be used to monitor the usage of an internal combustion engine of a piece of machinery.

Embodiments of this disclosure may use a local monitoring device to perform an engine monitoring routine on an internal combustion engine. The local monitoring device may be configured to be directly connected/attached to the internal combustion engine in order to monitor one or more characteristics of the internal combustion engine.

Figure 1:
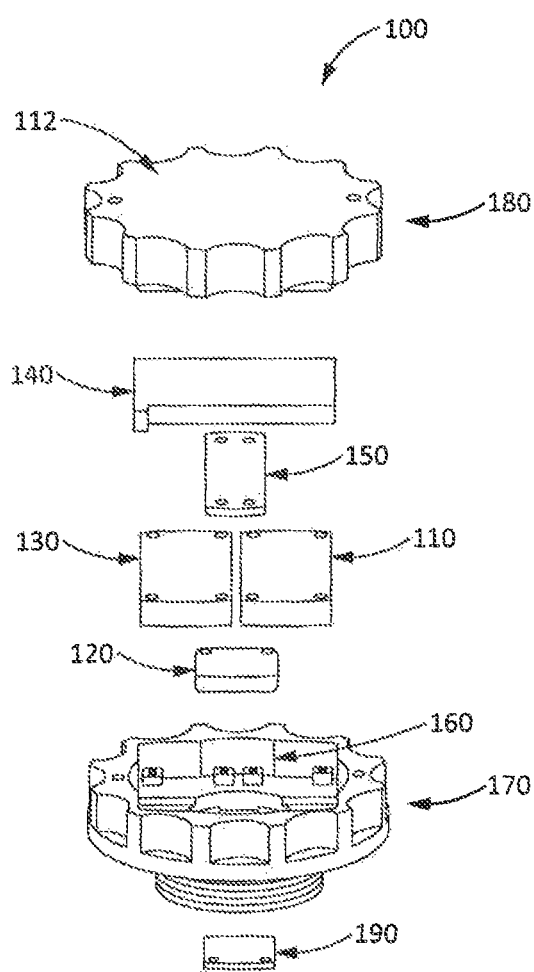
FIG. 1 shows an exploded view diagram of an engine oil filler cap for performing the engine monitoring routine according to an embodiment of this disclosure.

For example, the local monitoring device may be a smart engine oil filler cap 100 suitable for determining the engine speed of an internal combustion engine as shown in FIG. 1. The smart engine oil filler cap 100 may comprise a vibration sensor 120 or accelerometer for generating data representative of a plurality of vibrations of the internal combustion engine.

FIG. 1 shows an "exploded" representation of an example assembly of the smart engine oil filler cap 100. The assembly may comprise a processing and communications module 110, a vibration sensor 120 and a memory module 130. The assembly may further comprise a battery 140 and a battery brace 150. The processing and communications module 110, the vibration sensor 120 and the memory module 130 may all be arranged within a body cavity 160 in a filler cap body 170. A cover 180 may be fixed to the top of the filler cap body 170 in order to close and seal the body cavity 160.

The vibration sensor 120 is located towards the bottom of the body cavity 160 in the filler cap body 170, such that when the smart engine oil filler cap 100 is fitted to the engine, the vibration sensor 120 is close to the crankcase of the engine. By arranging these components in this way, the vibration sensor 120 may be positioned close to the engine, which may help to improve its accuracy of vibration sensing.

A cover 180 may be fixed to the filler cap body 170 in any suitable way, for example it may be a removable cover fixed to the filler cap body 170 using a screw thread, or by screws or pins that pass through the cover 180, into the filler cap body 170. In an alternative, the cover 180 may be removably fixed to the filler cap body 170 in any other suitable way, for example using a push-fit fixing. In a further alternative, the cover 180 may be fixed to the filler cap body in a non-removable way, for example by gluing or riveting.

The smart engine oil filler cap 100 may further comprises a sensor module 190 comprising a temperature sensor and/or a pressure sensor. The sensor module 190 may be mounted on an external surface of the filler cap body 170, on a surface on the underside of the a smart engine oil filler cap 100, such that when the smart engine oil filler cap 100 is fitted to the engine, the sensor module 190 is exposed to the crankcase of the engine so that crankcase temperature and/or crankcase pressure may be sensed by the sensor module 190. The top surface 112 of the oil filler cap 100 may be considered to be a first surface of the oil filler cap 100, and the opposing surface on the underside of the oil filler cap 100, where the sensor module 190 is mounted, may be considered to be a second, opposing surface of the oil filler cap 100.

The sensor module 190 may therefore be physically isolated from the other electrical components of the monitoring device (e.g. processing and communications module 110, vibration sensor 120, memory module 130). In this way, the other electrical components of the smart engine oil filler cap 100 may be protected from exposure to oil or debris from the crankcase, and insulated to some extent from heat generated by the engine, whilst still allowing the sensor module 190 to be exposed to the crankcase. The sensor module 190 may be connected to the processing and communications module 110 by a wired connection through the filler cap body 170, or by a wireless connection, in order to output the values indicative of the sensed crankcase pressure and/or crankcase temperature.

It will be appreciated that the assembly represented in FIG. 1 is only one, non-limiting, example of an assembly of the smart engine oil filler cap 100 in accordance with the present disclosure. In an alternative, the electrical components of the monitoring device may be arranged in any way on or within the smart engine oil filler cap 100. For example, the processing and communications module 110, vibration sensor 120, memory module 130, and battery 140 may be formed as a single unit, such as a single circuit board, and designed to be fitted to a mounting point anywhere on the smart engine oil filler cap 100. For example, the electrical components may be arranged on a single circuit board to be mounted in a cavity in the smart engine oil filler cap 100.

Alternatively, the electrical components of the smart engine oil filler cap 100 may be housed within a unit comprising a magnetic element and the mounting point may comprise a ferromagnetic material (such as iron) on the top of the smart engine oil filler cap (or the unit may comprise a ferromagnetic material and the mounting point may comprise a magnetic element on top of the smart engine oil filler cap). Alternatively, the electrical components may be housed within a unit designed to push-fit onto a mounting point on the top of an oil filler cap, or designed to screw onto a mounting point on the top of an oil filler cap, etc. An example of a smart engine oil filler cap 100 which may be used as a local monitoring device according to this disclosure is further described in GB 1609430.2.

The local monitoring device may transmit an aggregated summary to the remote application using a wireless communication method. For example, the local monitoring device may use a wireless communication method to transmit data to a remote application being executed on an electronic device within range of the near field communication network. In order to communicate using a wireless communication method, the local monitoring device may include means for transmitting data over a wireless network.

Embodiments of this disclosure may use a remote application to receive data transmitted from a local monitoring device and process the data in order to determine data regarding the usage of the internal combustion engine to which the local monitoring device is connected.

In one embodiment the processing and communications module 110 may include means for transmitting data wirelessly. For example, the local monitoring device may use a near field communication method signal to transmit data to a remote application being executed on an electronic device within range of the near field communication network. The means for communicating using a near field communication method may be a Bluetooth transmitter, a low energy Bluetooth transmitter, or a WiFi transmitter.

The processing and communications module 110 may be configured to support communications with one or more electronic devices local monitoring device according to any one or more communications protocols/architectures. For example, the processing and communications module 110 may support one or more types of wired communications, such as USB, Firewire, Thunderbolt, Ethernet, etc and/or one or more types of wireless communications, such as WiFi, Bluetooth, Bluetooth LE, Near Field Communications (NFC), Infra-red (IR) 5G, LTE, UMTS, EDGE, GPRS, GSM, or any other form of RF based data communications. The processing and communications module 110 enables at least one communications interface to be established between the local monitoring and an external network element. For example, the network element may be an electronic device, such as an internet server and/or a mobile telephone or smartphone and/or a tablet computer and/or a laptop computer and/or a desktop computer, etc. The interface may be a wired or wireless interface.

The data transmitted by the means for transmitting data over a wireless network may be received by an electronic device within range of the transmitted data. In the embodiments where data is transmitted using a Bluetooth or WiFi transmitter, the electronic device may be a smart phone, laptop or other portable electronic device. The remote application to which the data is being transmitted may be executed on the smart phone, or on another remote device or server.

In embodiments where the remote application is not executed on the electronic device, the transmitted data may be forwarded by the electronic device on to the remote application/remote server executing the remote application using further communication means. For example, a smart phone may use a mobile internet signal to forward the data received from the local monitoring device. A laptop may use a wireless internet connection to forward the data. As such, the skilled person will understand that the remote application may be executed on an electronic device in which directly receives the transmitted data from the local monitoring system, or a further remote server/remote device receives the transmitted data from the local monitoring system via one or more intermediate devices.

As discussed above, the remote application may be executed on an electronic device which is separate (remote) from the local monitoring device. For example, the remote application may be executed on a remote server, or on a processor of a smartphone or a laptop. The remote application may be configured to process the transmitted data received from the local monitoring device in order to determine engine usage data about the internal combustion engine to which the local monitoring device is directly attached.

The remote application may have access to a database or memory comprising engine characterising information relating to a plurality of different types of internal combustion engine. The engine characterising information for an internal combustion engine type may be associated with identification data of a local monitoring device according to the type of internal combustion engine to which it is attached. The engine characterising information associated with the identification data may be used to process the transmitted aggregated summary in order to determine engine usage data for the internal combustion engine.

The association between the identification data and the engine characterising data in the database may be provided by a user upon registration of the local monitoring device. For example, an application running on an electronic device may prompt a user to register the local monitoring device and enter information for identifying the local monitoring device and information for identifying the internal combustion engine. The application running on the electronic device may be the remote application used in the method of this disclosure, or it may be a separate application. The electronic device may be a smartphone, a tablet computer, a laptop, or any other portable electronic device with processing and wireless communication capabilities.

For example, a user may identify a local monitoring device by entering information such as a serial number of a local monitoring device. Alternatively, a user may scan a matrix barcode (QR code) displayed on the local monitoring device using a camera connected to the electronic device to identify the local monitoring device.

For example, a user may identify an internal combustion engine being monitored by the local monitoring device by entering a model number of an internal combustion engine, a model name/number of a piece of machinery, a serial number of an internal combustion engine and/or a serial number of a piece of machinery containing the internal combustion engine. Alternatively, a user may scan a matrix barcode (QR code) displayed on the internal combustion engine using a camera connected to the electronic device to identify the internal combustion engine. As such, the information provided may be any information suitable for identifying the type of internal combustion engine being monitored. If the local monitoring device is subsequently attached to a different internal combustion engine the information may be re-entered to the database to update the association.

Figure 2:
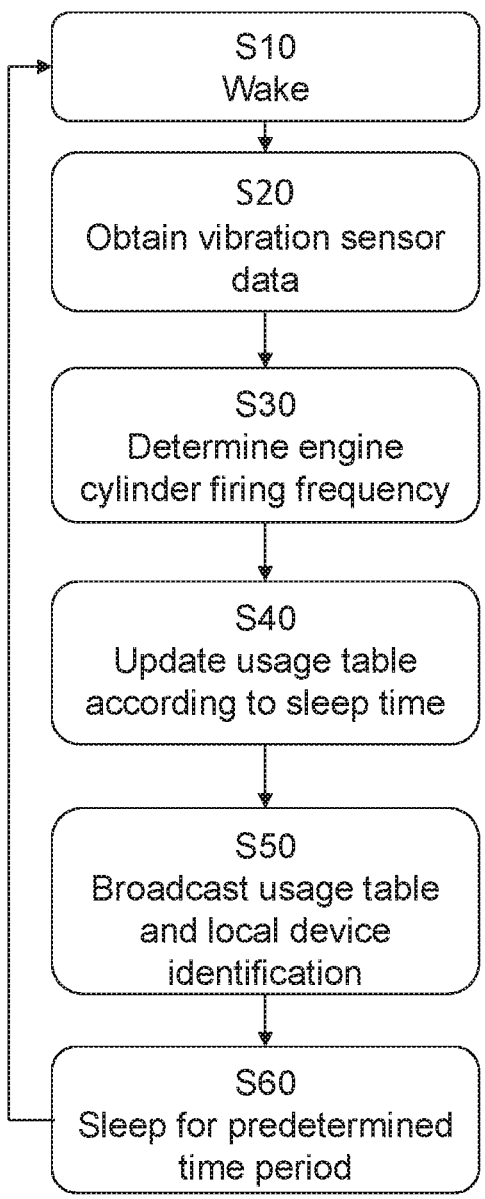
FIG. 2 shows a flow chart outlining method steps performed by a local monitoring device according to an embodiment of this disclosure.
Figure 3:
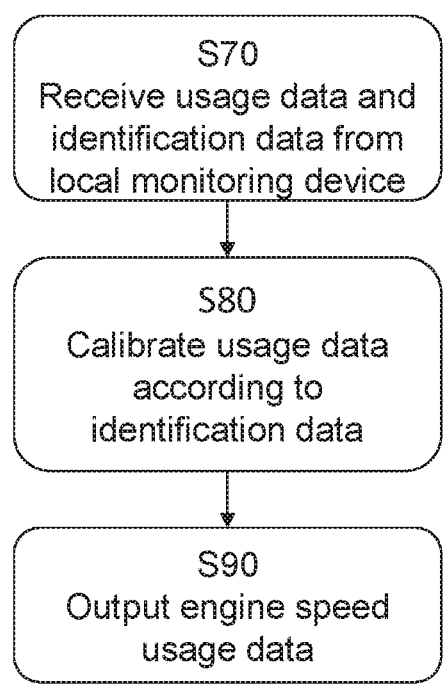
FIG. 3 shows a flow chart outlining method steps performed by a remote application according to an embodiment of this disclosure.

An embodiment of a method of monitoring the usage of an internal combustion engine according to this disclosure is shown in FIGS. 2 and 3. The method according to this embodiment is performed using a local monitoring device and a remote application. FIG. 2 shows the method steps performed by the local monitoring device while FIG. 3 shows the method steps performed by the remote application according to this embodiment.

FIG. 2 shows an example flow diagram for an operation of the local monitoring device. In Step S10, the processing and communications module 110 wakes from a lower power state. In step S20, the processing and communications module 110 receives from the vibration sensor 120 a value indicative of the sensed vibration of the engine and over time makes a record of the values indicative of the sensed vibration of the engine. As such, data is generated in the processing and communications module 110 which is representative of a plurality of vibrations of the internal combustion engine. The vibration may be a vibration of the engine in any direction, for example horizontal and/or vertical vibration. Engine vibrations may be largest in the vertical direction, (the difference between the peaks and troughs in vibration in the vertical direction may be greater than in other directions), resulting in a determination of engine vibration with lower 'noise'. Consequently, it may be preferable to configure the vibration sensor 120 to sense vertical engine vibrations, such that the processing and communications module 110 may make a record of values representative of the sensed vertical vibration of the engine.

The processing and communications module 110 records the values indicative of sensed engine vibration for a determination period of time, which may be any period of time that is sufficient for obtaining a reliable measurement of the firing frequency of the engine cylinders. For example, the determination period of time may be any period of time between 0.01 seconds to 10 minutes, such as 0.1 seconds, or 1 second, or 5 seconds, or 1 minute, or 8 minutes, or any period of time between 0.1 seconds to 1 minute, such as 0.3 seconds, or 3 seconds, or 10 seconds, or any period of time between 1 second to 1 minute, such as 8 seconds, or 42 seconds, etc. The processing and communications module 110 may comprise a clock for counting the determination period of time, such as a processor clock, or a crystal clock, or a GPS synchronised clock. The processing and communications module 110 may record the values indicative of sensed vibration of the engine by periodically sampling the value output from the vibration sensor 120. For example, it may sample the output from the vibration sensor 120 every 2 ms (which is a sampling frequency of 500 Hz) and record each of the sampled values during the determination period of time in order to generate data indicative of a plurality of vibrations of the engine. The sampling frequency may be any suitable frequency, for example any frequency between 50 Hz-10,000 Hz, such as 200 Hz, or 1000 Hz, or 8000 Hz, or any frequency between 100 Hz-5000 Hz, such as 150 Hz, or 800 Hz, or 2000 Hz, or any frequency between 100 Hz-1000 Hz, such as 400 Hz, or 600 Hz, etc. The sampling frequency may be chosen in consideration of the maximum dominant frequency expected for the engine vibration (for example, a sampling frequency that is sufficiently high to accurately measure the maximum expected dominant frequency in the engine vibration).

Figure 4:
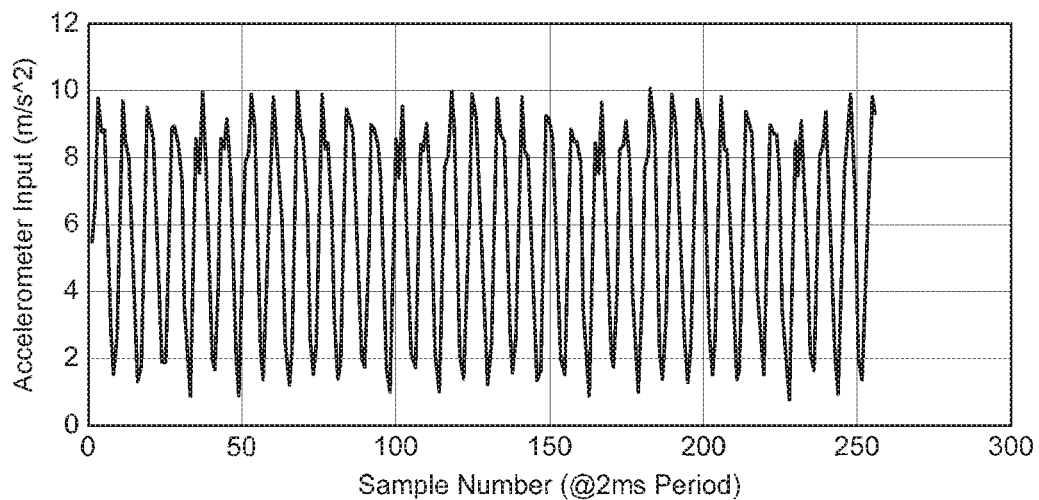
FIG. 4 shows an exemplary plot of vibration data generated by the vibration sensor of the local monitoring device.

FIG. 4 shows an example plot of the vibration sensor data generated in Step S20. In this example, the sampling frequency is 500 Hz, the determination period of time is 0.5 seconds (i.e., 250 samples), the vibration sensor 120 is an accelerometer configured to sense vertical acceleration of the engine and the engine is a four cylinder straight (in-line) engine. The x-axis on the plot is the sample number (which might equally be viewed as 'time') and the y-axis on the plot is the vertical acceleration of the engine in units of $m/s^2$.

In Step S30, the processing and communications module 110 determines the firing frequency of the cylinders of the engine based on the generated vibration sensor data. The processing and communications module 110 may do this by first determining the dominant frequency in the vibration sensor data, for example by performing a time-to-frequency domain transformation on the recorded engine vibration, such as a Fourier transform, or a Fast Fourier Transform (FFT), or a Laplace transform, etc.

Figure 5:
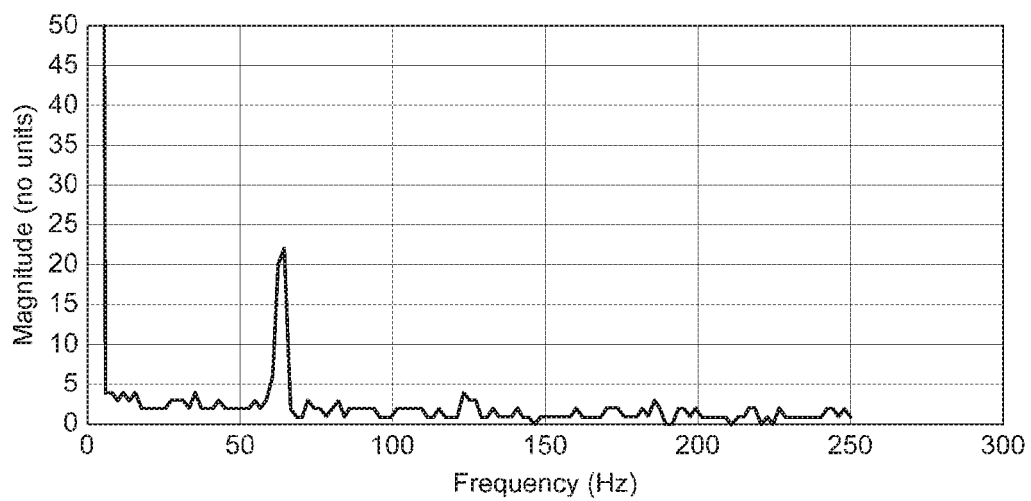
FIG. 5 shows a plot of the frequency response (i.e., the time-to-frequency transformation) of the generated vibration sensor data shown in FIG. 4.

FIG. 5 shows a plot of the frequency response (i.e., the time-to-frequency transformation) of the generated vibration sensor data shown in FIG. 4. The x-axis of the plot in FIG. 5 is frequency in units of Hz and the y-axis of the plot in FIG. 5 is a dimensionless measure of magnitude.

The processing and communications module 110 may then determine the dominant frequency by identifying the frequency with the greatest magnitude in the frequency response plot. The processing and communications module 110 may consider only a particular range of frequencies within the frequency response when finding the dominant frequency. The range may be defined by a lower frequency limit and an upper frequency limit, both of which may be set in consideration of expected engine vibration frequencies, in order to exclude any frequencies that fall outside of expected engine operation. The expected range of firing frequencies produced by an internal combustion engine will depend on the range of allowable engine revolution speeds during operation of the engine and the number of cylinders in the specific internal combustion engine. For example, if the idling speed of the engine is expected to generate a vibrational frequency of about 35 Hz and the maximum possible engine speed is expected to generate a vibrational frequency of about 90 Hz, the considered range may be 30 Hz (lower frequency limit) to 100 Hz (upper frequency limit). Of course, the maximum and minimum frequencies that an engine should generate will vary for different types of engine, for example with cylinder configuration (straight cylinder, V cylinder, Boxer, etc), engine speed limits and engine idle speeds. Therefore, the range of frequencies to be considered during determination of the dominant frequency may be set to allow for a range of different firing frequencies of different types internal combustion engines.

The dominant frequency may be the frequency corresponding to the peak frequency response. Where there are two or more peaks in the frequency response (for example, because the engine speed changed during the measurement period of time), the dominant frequency may be the frequency corresponding to the peak with the greatest magnitude. Thus, the dominant frequency may be the frequency of vibration that was generated by the engine for the longest period of time during the measurement period of time.

The processing and communications module 110 may then determine the firing frequency of the engine cylinders based on the dominant frequency. A measure of frequency in Hertz is a measure of the number of vibration cycles per second. To convert vibrational frequency in Hz to the number of vibration cycles per minute, the dominant frequency may be multiplied by 60. Vibration cycles may be caused by cylinder combustion events, thus the dominant frequency may also be thought of as the firing frequency of the engine.

In Step S40, the processing and communications module 110 may record the determined firing frequency of the engine cylinders in the memory module 130. One exemplary way in which the determined engine speed may be recorded in the memory module 130 is explained below.

The processing and communications module 110 may look up an element in an aggregated summary stored in the memory module 130 based on the determined engine cylinder firing frequency. The aggregated summary may comprise a plurality elements corresponding to ranges of engine cylinder firing frequencies and the cumulative time for which the engine has been determined to be operating within each of the engine cylinder firing frequency ranges. A non-limiting example of an aggregated summary is set out below:

| Engine cylinder firing frequency | Cumulative time (Hours) |
|---|---|
| 0 Hz-10 Hz | 4.93 |
| 10 Hz-20 Hz | 6.76 |
| 20 Hz-30 Hz | 5.49 |
| 30 Hz-40 Hz | 2.65 |
| 40 Hz-50 Hz | 1.14 |
| 50 Hz-60 Hz | 5.32 |
| 60 Hz-70 Hz | 9.89 |
| 70 Hz-80 Hz | 3.10 |
| 80 Hz-90 Hz | 3.92 |
| 90 Hz-100 Hz | 0.74 |
| 100 Hz-110 Hz | 6.21 |
| 110 Hz-120 Hz | 4.42 |
| . . . | . . . |

It will be appreciated that the aggregated summary may comprise any number of engine cylinder firing frequency ranges, and the ranges may be of any suitable size and spread.

The processing and communications module 110 may determine which of the plurality of engine cylinder firing frequency ranges the determined engine cylinder firing frequency lies within and then add the determination period of time to the cumulative time for that element of the aggregated summary. As such, the local monitoring device generates an aggregated summary by updating an element of the aggregated summary based on the determined firing frequency of the engine. Accordingly, a picture of the operation of the internal combustion engine may be built up over time.

Preferably, the element of the aggregated summary is updated by incrementing the existing value of the element with an amount corresponding to the determination period of time. The determination period of time may be the amount time elapsed following a previous performance of the engine monitoring routine i.e. the amount of time elapsed since the previous engine firing frequency measurement.

In the example described above in respect of FIGS. 4 and 5, if the determined engine cylinder firing frequency is 65 Hz the processing and communications module 110 may determine that the determined engine cylinder firing frequency lies within the range 60-70 Hz. The processing and communications module 110 may then add the determination period of time to the cumulative time recorded for that element in the aggregated summary.

For example, if the cumulative time recorded in the aggregated summary for the element corresponding to the engine firing frequency range of 60-70 Hz is 9.89 hours, and the determination period of time is 0.5 seconds, the cumulative time recorded element for 60-70 Hz will be updated to 9.89 hours+0.5 seconds.

Having added the determination period of time to the cumulative time for the determined element of the aggregated summary, the processing and communications module 110 may then write the updated element to the aggregated summary in the memory module 130.

It will be appreciated that the engine firing frequency ranges and cumulative times may be saved in the memory module 130 in any suitable way, for example using any known database or matrix techniques.

After recording the determined engine firing frequency to the memory module 130 in accordance with the above exemplary method, the processing and communications module 110 may return to Step S20. In this way, the engine cylinder firing frequency may be regularly determined, or sampled, (for example, every 0.5 seconds) and then stored in the memory module 130, such that extensive engine firing frequency data may be stored over time without a significant increase in the size of the aggregated summary stored in the memory module 130. It will be appreciated that after recording of the values indicative of sensed engine vibration over the determination period of time is completed in Step S20 and the process proceeds to Step S30, recording of values indicative of sensed engine vibration for the next determination period of time may immediately begin whilst Steps S30 and S40 are being performed, such that there is no period of operation of the engine that does not contribute to a determination of the engine cylinder firing frequency. Consequently, whilst Steps S30 and S40 are being carried out in respect of the most recently completed recording of the values indicative of sensed engine vibration, the next recording of values indicative of sensed engine vibration may already be underway.

In step S50, the processing and communications module 110 may broadcast/transmit the aggregated summary to a remote application. The broadcasting step may be performed every time the aggregated summary is updated. Alternatively, the broadcasting step may only be performed after at least: 50, 100, 200, 500, 1000, or 5000 updates to the aggregated summary. For example, the local monitoring device may be configured to broadcast once, twice or three times per day. By limiting the number of times the local monitoring device broadcasts the aggregated summary, the local monitoring device may conserve power and not utilise excessive amounts of bandwidth of a communications network.

In step S50, the processing and communications module 110 may also broadcast identification data which allows a remote application to identify the internal combustion engine to which the local monitoring device is connected to. For example, the processing and communications module 110 may broadcast a unique identification code, for example a serial number of the local monitoring device.

The processing and communications module 110 may transmit/broadcast the aggregated summary and the identification data over a wireless network to a remote application which may be executed on a remote server.

After updating the aggregated summary in step S40, or broadcasting the data in step S50, the local monitoring device may optionally sleep for a predetermined period of time before performing the next measurement of the engine vibrations. For example, the local monitoring device may sleep for 30 seconds, 60 seconds, 120 seconds or 240 seconds. According to the embodiment shown in FIG. 2, the sleep step S60 is configured to sleep the device for a period of 30 s. During the sleep step, the local monitoring device may operate in a low power state. The processing and communications module may consume little or no energy, and the vibration sensor 120 may not be operated/powered until the sleep step is over. By sleeping for a period of time between samples of the engine vibration, engine usage data for the engine may be obtained over an extended period of time whilst conserving power of the local monitoring device. In order to ensure that the total time in the aggregated summary reflects the usage of the engine, the predetermined period of time for the sleep step duration S60 may be used as the determination period for incrementing the cumulative time recorded in an element of the aggregated summary.

Preferably, the above described engine monitoring routine is repeated over time in order to build up a history of engine usage data over a time period. The time period may be at least a single day, a week, a month or a year. The engine monitoring routine may be repeated a number of times in a single day. As discussed above, preferably steps S10, S20, S30 and S40 are performed in sequence and repeated relatively frequently, for example every 30 seconds in order to build up a profile of the usage of the engine. Step S50 is preferably performed only a few times each day, in order to conserve the battery of the local monitoring device.

With reference to FIG. 3, the operation of the remote application according to an embodiment of this disclosure will now be described.

As shown in FIG. 3, in step S70 the remote application receives the aggregated summary and identification data from the local monitoring device. Data may be received over a wireless network or other means as discussed previously above. The data received may include the most recently updated version of the aggregated summary stored in the memory 130 of the local monitoring device.

The identification data received by the remote application may be a unique identification code associated with the local monitoring device which allows the remote application to determine the type of internal combustion engine which the local device is monitoring. For example, the local monitoring device may transmit a serial number of the local monitoring device which is unique to the local monitoring device. The remote application may then consult a database to determine engine characterising data related to the internal combustion engine.

The database may contain information regarding the local monitoring device and/or the internal combustion engine associated with the local monitoring device. For example, the database may contain a profile associated with the identification code of the local monitoring device which provides engine characterising information about the internal combustion engine such as the type of engine, the number of cylinders, the number of firing events per engine revolution etc. The database may be populated by a user or installer performing an initial registration of the local monitoring device when the monitoring device is fitted to the internal combustion engine. Initial registration may include sending information such as the local monitoring device identification code and the internal combustion engine type to the remote application and/or another remote server which then populates the database with the engine characterising data suitable for the internal combustion engine.

In step S80, the remote application processes the aggregated summary to determine engine usage data about the internal combustion engine. For example, the remote application may process the engine cylinder firing frequency ranges into engine speed ranges for the specific internal combustion engine. Accordingly, the processed engine usage data may be engine speed usage data which reflects the periods of time spent by the internal combustion engine in each engine speed range.

The remote application may process the engine cylinder firing frequency ranges into engine speed ranges by looking up an engine characterising value for determining a number of combustion events per engine revolution of the internal combustion engine. The engine characterising value may be obtained from the database by the remote application by looking up an entry associated with the identification data sent by the local application. As such, the remote application uses the identification data to determine the number of cylinders/number of combustion events of the internal combustion engine.

The engine speed ranges may be calculated from the engine firing frequency ranges as the number of cylinder combustion events, or firing events, per engine revolution depends on the configuration of the cylinders. For example, for a four cylinder straight (in-line) engine, there may be two combustion events per engine revolution. Consequently, the firing frequency would be double the engine speed. However, for a three cylinder straight (in-line) engine, there may be 3 combustion events for every two engine revolutions (i.e., 1.5 combustion events per engine revolution), and for a six cylinder straight (in-line) engine, there may be three combustion events per engine revolution. Consequently, the firing frequency would be one and a half times the engine speed.

The engine firing frequency may therefore be converted into an engine speed by applying the following formula, where the firing frequency is the firing frequency ranges of the aggregated summary, and N is the number of combustion events per engine revolution of the identified internal combustion engine.

$$\text{Engine speed} = \frac{\text{Firing frequency (in Hz)} \times 60}{N}$$

Therefore, for a four cylinder straight engine with two combustion events per engine revolution (N=2), the engine speed in RPM may be calculated as follows:

$$\text{Engine speed} = \frac{\text{Firing frequency (in Hz)} \times 60}{N}$$

Figure 7:
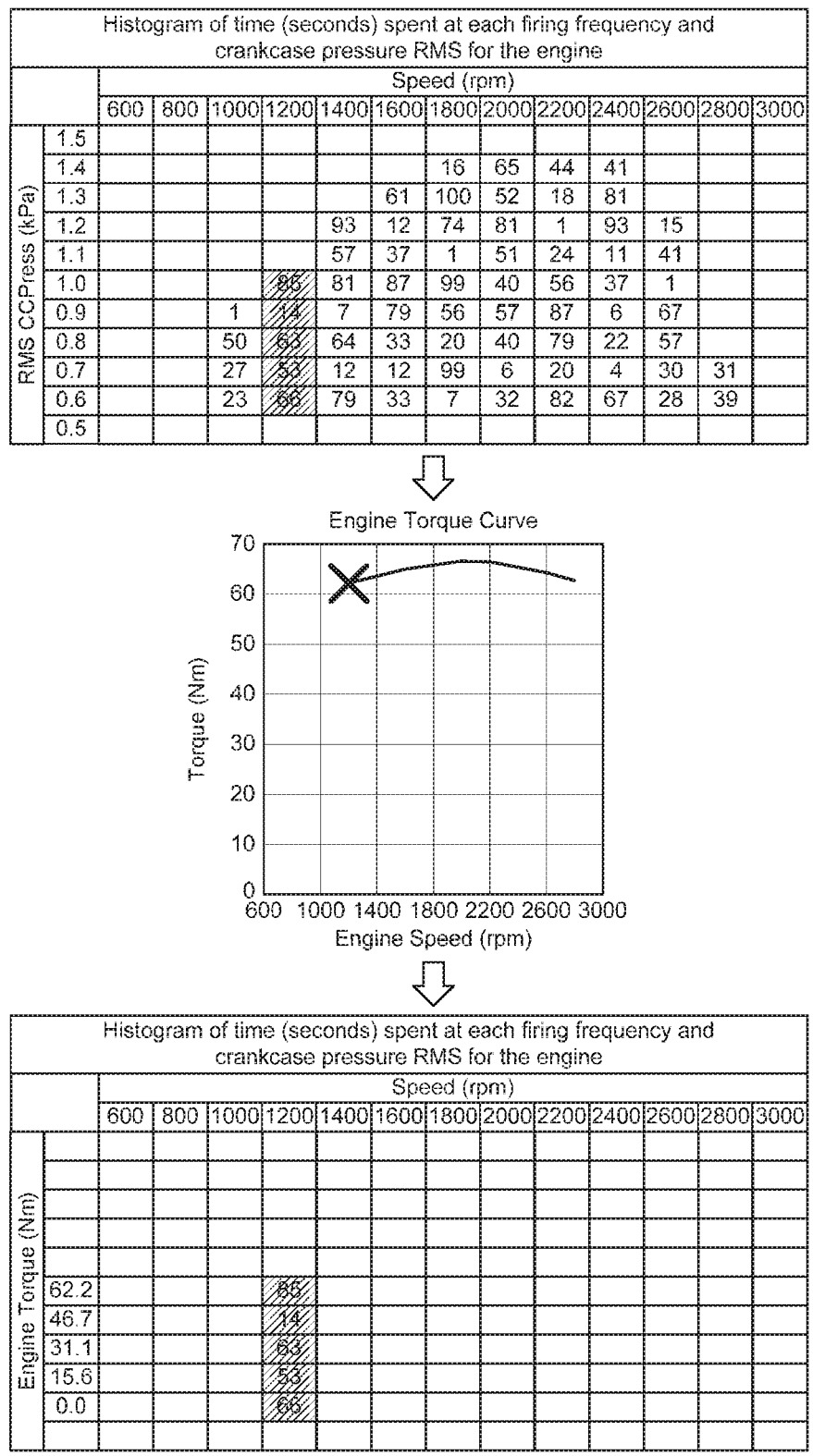
FIG. 7 shows a representation of the conversion of the engine crankcase data in the aggregated summary into engine torque output usage data according to an embodiment of this disclosure.
Figure 8:
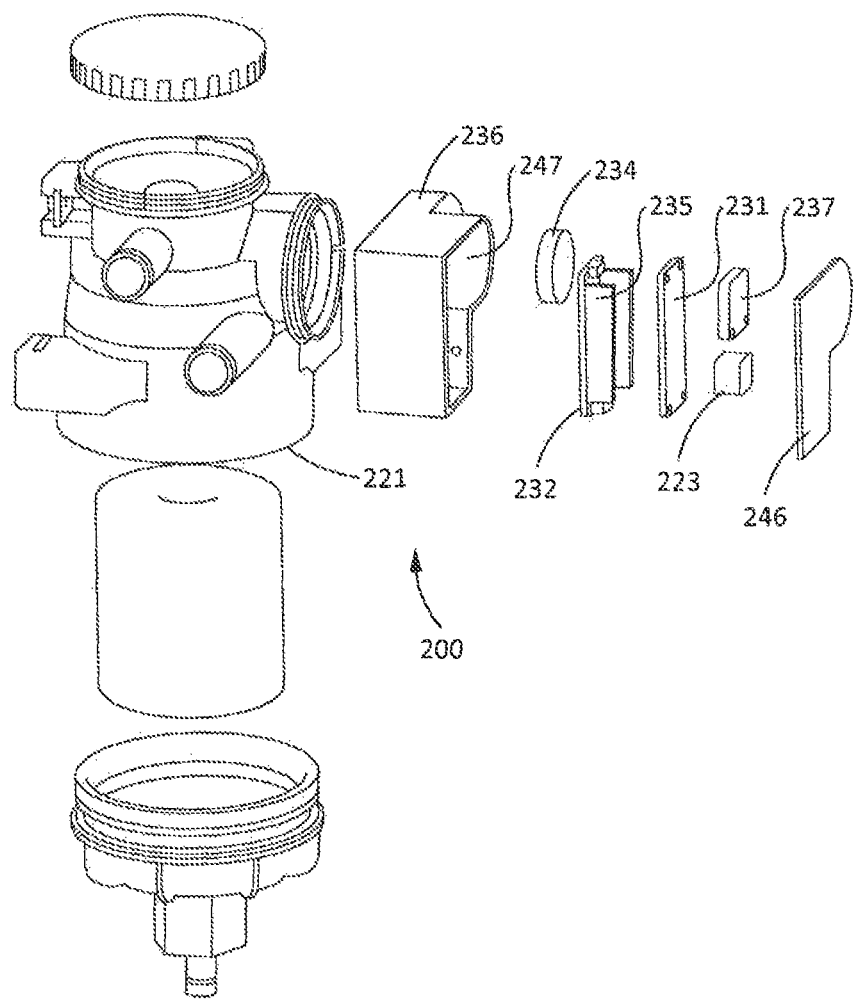
FIG. 8 shows an exploded diagram of a smart breather filter assembly suitable for use as a local monitoring device according to the present disclosure.

As an example of the processing technique for calculating engine speed, the recorded engine vibration represented in the plot of FIG. 7, and corresponding frequency domain plot of FIG. 8, were made on a four cylinder straight engine (N=2). As can be seen, the dominant frequency in the frequency response represented in FIG. 8 is 65 Hz. Therefore, the determined engine speed is:

$$\text{Engine speed} = \frac{65 \times 60}{2}$$

$$\text{Engine speed} = 1950 \; RPM$$

Accordingly, the above engine speed calculation may be applied to each of the engine cylinder firing frequency ranges transmitted by the local monitoring device to determine engine speed usage data about the internal combustion engine.

In step 90, the engine speed usage data may be output. The engine speed usage data may be output to a memory associated with the remote application where the engine speed usage data is stored. Alternatively, the engine speed usage data may be output to a display for assessment by a user. The engine speed usage data may be displayed as a histogram to allow a user to quickly assess the usage history of the internal combustion engine.

In an alternative embodiment, the local monitoring device may also utilise a pressure sensor to monitor the crankcase pressure of the internal combustion engine 1. For example, when the local monitoring device is a smart engine oil filler cap 100 as described above, the pressure sensor of sensor module 190 may be used to generate pressure sensor data indicative of the crankcase pressure of the internal combustion engine 1.

The pressure sensor may generate pressure sensor data which is output to the processing and communications module 110 of the local monitoring device. The processing and communications module 110 may record the values indicative of the sensed engine crankcase pressure for a determination period of time, which may be any period of time that is sufficient for obtaining a reliable measurement of the engine crankcase pressure. Similar sampling techniques as discussed above for the vibration sensor 120 may be used in order to generate a plurality of data points representative of the crankcase pressure of the internal combustion engine using a pressure sensor of the local monitoring device.

The processing and communications module 110 may process the plurality of pressure sensor data points to determine a value indicative of the average engine crankcase pressure during the determination period of time. Preferably, the root mean square (RMS) of the engine crankcase pressure (RMS crankcase pressure) is determined by the processing and communications module using the plurality of data points recorded from the pressure sensor.

The determined values of engine firing frequency and RMS crankcase pressure may be used to generate an aggregated summary of the engine usage. As with Step S40 of the previous embodiment, the aggregated summary comprises a plurality of elements which reflect the cumulative usage of the internal combustion engine. In this further embodiment, the elements of the aggregated summary are provided in a matrix form, whereby the determined values of engine firing frequency and RMS crankcase pressure are used to select an element to be updated.

The aggregated summary may comprise a plurality elements corresponding to ranges of engine cylinder firing frequencies and ranges of crankcase pressures. Each element in the aggregated summary may contain a value indicative of the cumulative time for which the engine has been determined to be operating within engine cylinder firing frequency ranges and crankcase pressure range. As such, the aggregated summary is a data table comprising information regarding the usage history of the internal combustion engine for a plurality of ranges of engine firing frequencies and a plurality of crankcase pressure ranges. A non-limiting example of an aggregated summary according to this embodiment of the disclosure is set out below:

| Histogram of time (seconds) spent at each firing frequency and crankcase pressure RMS for the engine. | | | | | | | | | | | | | | |
|---|---|---|---|---|---|---|---|---|---|---|---|---|---|---|
| | | Frequency (Hz) | | | | | | | | | | | | |
| | | 30 | 40 | 50 | 60 | 70 | 80 | 90 | 100 | 110 | 120 | 130 | 140 | 150 |
| RMS CCPress (kPa) | 1.5 | | | | | | | | | | | | | |
| | 1.4 | | | | | | | 16 | 65 | 44 | 41 | | | |
| | 1.3 | | | | | | 61 | 100 | 52 | 18 | 81 | | | |
| | 1.2 | | | | | 93 | 12 | 74 | 81 | 1 | 93 | 15 | | |
| | 1.1 | | | | | | 57 | 37 | 1 | 51 | 24 | 11 | 41 | |
| | 1.0 | | | | 85 | 81 | 87 | 99 | 40 | 56 | 37 | 1 | | |
| | 0.9 | | | 1 | 14 | 7 | 79 | 56 | 57 | 87 | 6 | 67 | | |
| | 0.8 | | | 50 | 63 | 64 | 33 | 20 | 40 | 79 | 22 | 57 | | |
| | 0.7 | | | 27 | 53 | 12 | 12 | 99 | 6 | 20 | 4 | 30 | 31 | |
| | 0.6 | | | 23 | 66 | 79 | 33 | 7 | 32 | 82 | 67 | 28 | 39 | |
| | 0.5 | | | | | | | | | | | | | |

In the aggregated summary above, the columns of the table/matrix represent columns of elements corresponding to ranges of engine cylinder firing frequency. The rows of the table/matrix represent rows of elements corresponding to RMS crankcase pressures (MRS CCPress (kPa)).

As an example of the updating the aggregated summary, in the aggregated summary provided above if the determined RMS crankcase pressure was 1.25 kPa and the determined engine cylinder firing frequency was 95 Hz, then the element with a value of 74 would be selected to be incremented by the determination time period.

Once the aggregated summary has been updated, the engine monitoring routine may proceed to a transmitting/broadcasting step (i.e. similar to step S50), or the engine monitoring routine may proceed to a sleep step (i.e. similar to step S60) if it is not required to broadcast/transmit the aggregated summary at that point.

The skilled person will appreciate that the broadcasting step according to this alternative embodiment may be substantially the same as broadcasting step S50 but broadcasting the larger aggregated summary with both crankcase pressure and engine cylinder firing frequency data included.

As discussed previously, the aggregated summary of this embodiment is a matrix of elements. As such, the aggregated summary effectively has axes of engine firing frequency and engine crankcase pressure. The remote application which receives the aggregated summary of this alternative embodiment may process the engine cylinder firing frequency usage data in a similar manner to the method described above in order to generate engine speed usage data.

The remote application may also process the RMS crankcase pressure data in the aggregated summary based on the identification data for the engine to determine further engine usage data. As with the previous embodiment, the remote application may use the identification data to determine engine characterising data of the internal combustion engine associated with the local monitoring device.

For example, the remote application may also process the engine crankcase pressure ranges to determine engine torque output usage data for the internal combustion engine. The remote application may determine engine torque output usage data based on the engine crankcase pressure, the engine speed and engine characterising data stored in the database.

Figure 6:
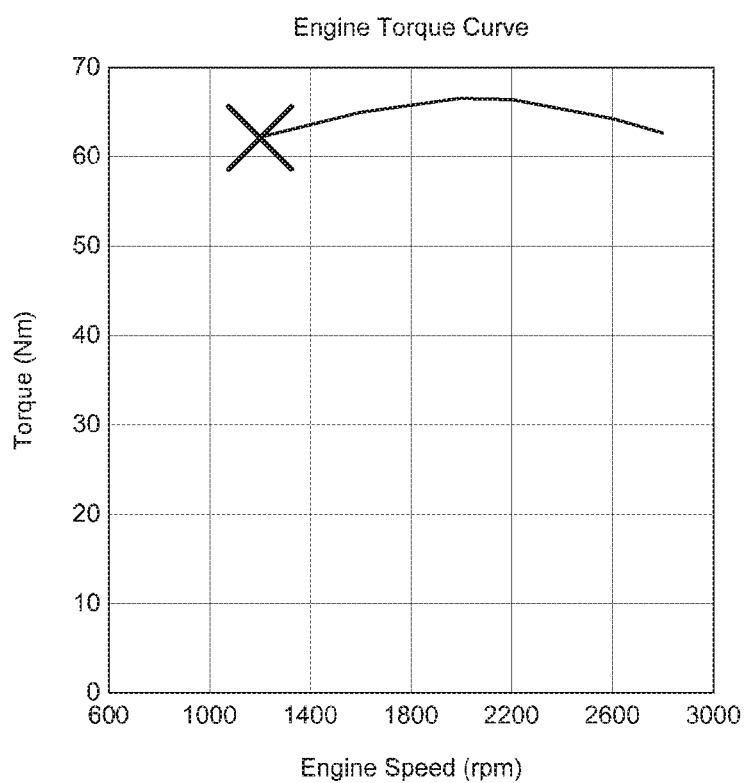
FIG. 6 shows an exemplary pot of an engine torque curve.

Crankcase pressure measurements may be converted into engine torque measurements if the engine torque curve is known for the internal combustion engine at that engine speed of operation. An example of an engine torque curve is shown in FIG. 6, which shows the maximum torque output of a specific internal combustion engine for a range of engine speeds.

In a closed circuit breather engine (i.e. an engine where the crankcase gasses are filtered and ingested by the engine), as engine torque increases the crankcase pressure decreases. In an open circuit breather engine (i.e. an engine where the crankcase gasses are filtered and vented to atmosphere), as engine torque increases the crankcase pressure increases.

Over a period of time, the local monitoring device will record the crankcase pressure of the monitored internal combustion engine operating at a range of different output torques for a range of different engine speeds. For a given engine speed, the aggregated summary may contain a number of elements indicating engine usage at a range of different crankcase pressures. As such, for a give engine speed the aggregated summary will provide an indication of the maximum and minimum crankcase pressures recorded at that engine speed. As the internal combustion engine may be operated at a range of different engine torque outputs from a minimum output (i.e. 0 Nm, 0% of maximum output) to a maximum output (i.e. 100% of the maximum output as indicated by the engine torque curve), the engine crankcase pressure ranges may be to reflect the range of possible torque outputs.

Thus, the maximum torque output of the internal combustion engine for a given engine speed may be related to the maximum or minimum crankcase pressure range recorded for a given speed range in the aggregated summary, depending on the type of internal combustion engine being monitored.

For example, FIG. 7 shows an example of scaling the RMS crankcase pressure ranges for an engine speed range of 1100-1200 rpm. As shown in FIG. 12, the measured crankcase pressures in the aggregated summary for an engine speed of 1200-1400 rpm range from 0.6 kPa to 1.0 kPa. Based on the identification data transmitted along with the aggregated summary, an engine torque curve, or corresponding engine parameter information may be identified for the internal combustion engine being monitored. The engine parameter information (engine torque curve) indicates a maximum torque output for the internal combustion engine at a given engine speed. Where the engine speed is a range of engine speeds, the average engine speed for the range may be used. In this example, an engine speed of 1300 rpm may be used to determine that the maximum torque output for the engine may be 62.2 Nm. In this example, it is also known that the engine is an open circuit breather engine. Accordingly, the element corresponding to the maximum crankcase pressure range is set to be indicative of the maximum torque output (62.2 Nm) and the element corresponding to the minimum crankcase pressure is set to be indicative of the minimum torque output (0 Nm). The crankcase pressure ranges remaining between the maximum and minimum are scaled between the maximum and minimum values. The scaling may be applied in a linear manner or a non-linear manner. For example, as shown in FIG. 7, a linear scaling technique is used.

The above described example for processing the engine crankcase pressure may be repeated for all engine speed ranges and stored or output by the remote application to a display. Accordingly, the high speed crankcase pressure data traces can be processed to extract a value proportional to torque, regardless of breather system. The remote application can therefore generate usage data reflecting the amount of time the internal combustion engine has spent operating at different torque outputs.

The skilled person will appreciate that over time the populated elements of the aggregated summary table will increase over time as the local monitoring device monitors the usage of the internal combustion engine. Accordingly, the accuracy of the engine torque output usage data will increase over time as the aggregated summary is populated.

In a further alternative embodiment the local monitoring device may be connected to the Control Access Network (CAN) bus of a vehicle. This may allow the processing and communications module to make use of the on board communications equipment of the vehicle via the CAN bus in order to transmit the engine usage data to a remote application.

In order to connect to the CAN bus, the local monitoring device may further include a connection port for making a wired connection between the CAN bus and the processing and communications module of the local monitoring device. By including a connection to the CAN bus, the local monitoring device may communicate with the on-board computer of a vehicle and may make use of any communications modules included in the vehicle. As such, the processing and communication module may not need to include its own means for establishing a wireless network connection to send engine usage data, if the CAN bus connection can be provided.

In the above described embodiments, a description of a smart engine oil filler cap 100 has been provided as an example of a local monitoring device. The skilled person will appreciate that the above described methods may be applied to any local monitoring device that may be directly attached to an internal combustion engine so as to vibrate in unison with the internal combustion engine. In particular, a local monitoring device may also be provided as a smart breather filter assembly 200 or a smart dipstick 300.

For example, a smart breather filter assembly 200 may be used as a local monitoring device according to this disclosure. FIG. 8 shows an exploded diagram of a smart breather filter assembly 200 suitable for use as a local monitoring device according to the present disclosure.

Similar to the smart engine oil filler cap 100, the smart breather filter assembly 200 provides all the functionality of a prior art breather filter assembly, namely being configured to receive a breather filter for filtering oil out of the crankcase gases.

The smart breather filter assembly 200 further comprises an electronics housing 236 fastened to the breather filter casing body 221. The electronics housing 236 comprises a lid 246 by which the contents of the housing may be accessed. Within the electronics housing 236 there is located a differential pressure sensor 223 and a vibration sensor 237 mounted on a first circuit board 231. Preferably the vibration sensor is an accelerometer. Also contained within the electronics housing 236 are a communications module (not shown) and a microprocessor (not shown) mounted on a second circuit board 232. The communications module may comprise a Bluetooth chip or other communication means.

The housing further contains a battery 234. The battery 234 is connected directly or indirectly to one or both of the circuit boards 231, 232 via a pair of supply connectors (not shown). Further connections 235 for data and/or power are provided between the first and second circuit boards 231, 232.

As with a prior art breather filter, when the smart breather filter assembly 200 is installed on an internal combustion engine 1 to filter oil out of the crankcase gases, it will vibrate in unison with the internal combustion engine 1.

Figure 9:
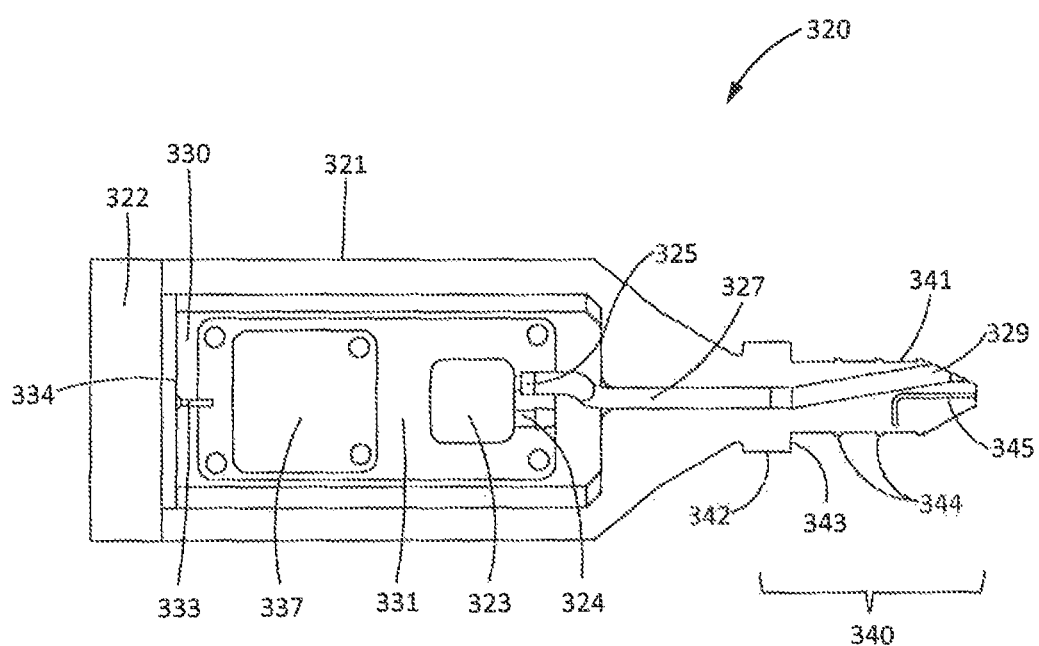
FIG. 9 shows a sectional view of a smart dipstick suitable for use as a local monitoring device according to the present disclosure.
Figure 10:
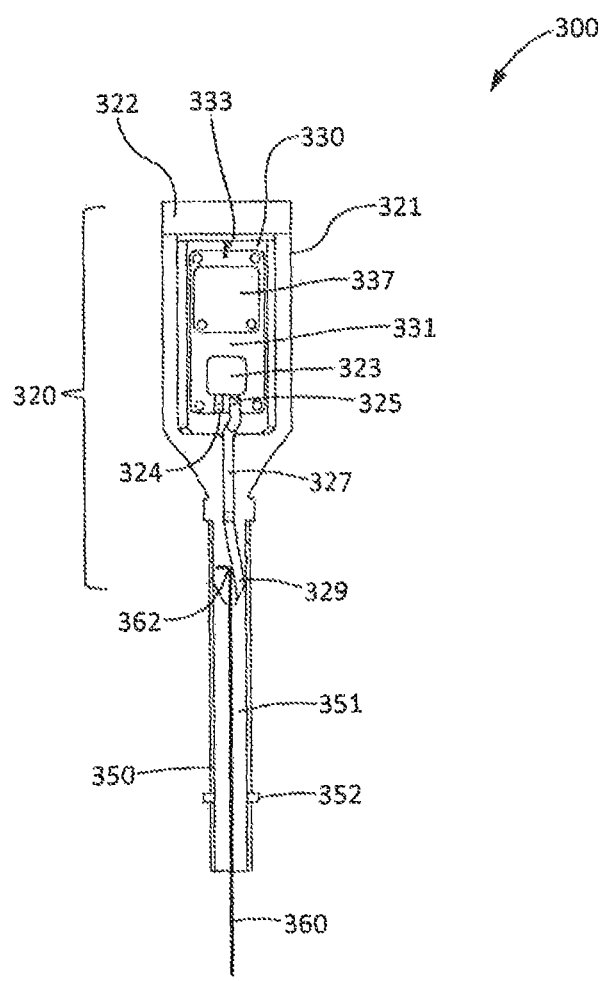
FIG. 10 shows a sectional view of a handle of a smart dipstick suitable for use as a local monitoring device according to the present disclosure.

Alternatively, the local monitoring device may be an engine oil "smart" dipstick (smart dipstick) 300 suitable for determining the engine speed and or engine torque of an internal combustion engine. FIG. 9 shows a diagram of one example of a smart dipstick 300 suitable for use as a local monitoring device according to the present disclosure. FIG. 10 shows a sectional view of a handle 320 of the smart dipstick 300.

The smart dipstick 300 comprises a handle 320, a dipstick tube 350 and a dipstick gauge 360. In this way, the smart dipstick 300 provides all the functionality of a prior art dipstick, namely being configured to be received into a dipstick insertion aperture of an internal combustion engine 1. The dipstick tube may comprise an exterior seal 352 that is configured to abut a corresponding element within the dipstick insertion aperture. In this way, the dipstick insertion aperture is fluidly sealed with the smart dipstick 300 in situ.

The dipstick gauge 360 comprises a series of markings (not shown) that correspond with a series of volumes of oil that may be present in the engine. The dipstick gauge 360 is configured such that a film of oil is retained on the dipstick gauge when the dipstick is removed from the dipstick insertion aperture. In this way, an operator can remove the smart dipstick 300 from the dipstick insertion aperture to check that an appropriate volume of oil is present.

The handle 320 comprises a handle body 321 and a handle lid 322. The handle 320 comprises an interior cavity 330, as shown in FIG. 10, defined by an interior volume within the handle body 321 and the handle lid 322.

The dipstick tube 350 comprises a cylindrical interior cavity 351.

The handle 320 comprises a first conduit 326 and a second conduit 327. The first conduit 326 provides fluid communication between the interior cavity 330 and a first opening 328 located on an exterior of the handle body 321 (see FIG. 10). In this way, the first conduit 326 provides fluid communication with atmosphere. The second conduit 327 provides fluid communication between the interior cavity 330 and a second opening 329 located in the nose portion 341 and positioned between the annular face 343 and the distal end. In this way, the second conduit 327 provides fluid communication between the interior cavity 330 and the interior of the dipstick tube 350.

The second opening 329 is located in a slanted face of the distal end 141 that is slanted relative both to a radial plane of the handle 320 and to an axial plane of the handle 320. In this way, the second opening 329 opens directly and without restriction into the cylindrical interior cavity 351 of the dipstick tube 350.

Accordingly, when the smart dipstick 300 is received within a dipstick insertion aperture of an internal combustion engine 1, the second opening 329 is in direct fluid communication with the interior of the crankcase of the internal combustion engine 1.

Within the interior cavity 330 there is provided a differential pressure sensor 323 for sensing a difference in pressure between a first sensor port 324 and a second sensor port 325. The first sensor port 324 is in fluid communication with the first conduit 326 while the second sensor port 325 is in fluid communication with the second conduit 327.

Overall, the arrangement results in the first sensor port 324 being in fluid communication with atmosphere and the second sensor port 325 being in fluid communication with the interior of the dipstick tube 350. Accordingly, the differential pressure sensor 323 is configured to sense a pressure difference between the interior of the dipstick tube 350 and atmosphere. When the smart dipstick is located in a dipstick insertion aperture of an internal combustion engine 1, the interior of the dipstick tube 350 is in fluid communication with the interior of the crankcase of the internal combustion engine 1.

The interior cavity 330 comprises a first circuit board 331 on which are mounted the differential pressure sensor 323 and a vibration sensor 337. Preferably the vibration sensor 337 is an accelerometer. Also within the cavity there is provided a second circuit board 132 on which are mounted a microprocessor 139 and a communications module 138. The communications module 138 may comprise a Bluetooth chip or other communication means.

A battery 334 is located within the interior cavity 330 and mounted to an interior of the handle lid 322. The battery is connected directly or indirectly to one or both of the circuit boards 331, 332 via a pair of supply connectors 333. Further connections for data and/or power are provided between the first and second circuit boards 331, 332.

Replacement of the battery 334 is facilitated by removal of the handle lid 322. The handle lid 322 may affix to the handle body 321 by means of a bayonet or screw connection.

While, in the above described exemplary smart dipstick 300, there is shown and described both a vibration sensor 337 and a differential pressure sensor 323, it may be that in alternative embodiments, only vibration sensor 337 is provided. Furthermore, it may be that an absolute pressure sensor is provided, instead of a differential pressure sensor, for measuring an absolute pressure at the second opening 329.

In use as a local monitoring device, the smart dipstick 300 is placed into the dipstick insertion aperture until the exterior seal 352 abuts a corresponding sealing element (not shown) within the dipstick insertion aperture.

As with a prior art dipstick, when the smart dipstick 300 is in situ in the dipstick insertion aperture of an internal combustion engine 1, it will vibrate in unison with the internal combustion engine 1. Furthermore, the cylindrical interior cavity 351 of the dipstick tube 350 will be at the same pressure as the dipstick insertion aperture (on the interior side of the exterior seal 352 and corresponding element). Accordingly, a pressure at the second sensor port 325 of the differential pressure sensor 323 is the same as the pressure, or at least predictably related to the pressure, within the crankcase of the engine.

Figure 11:
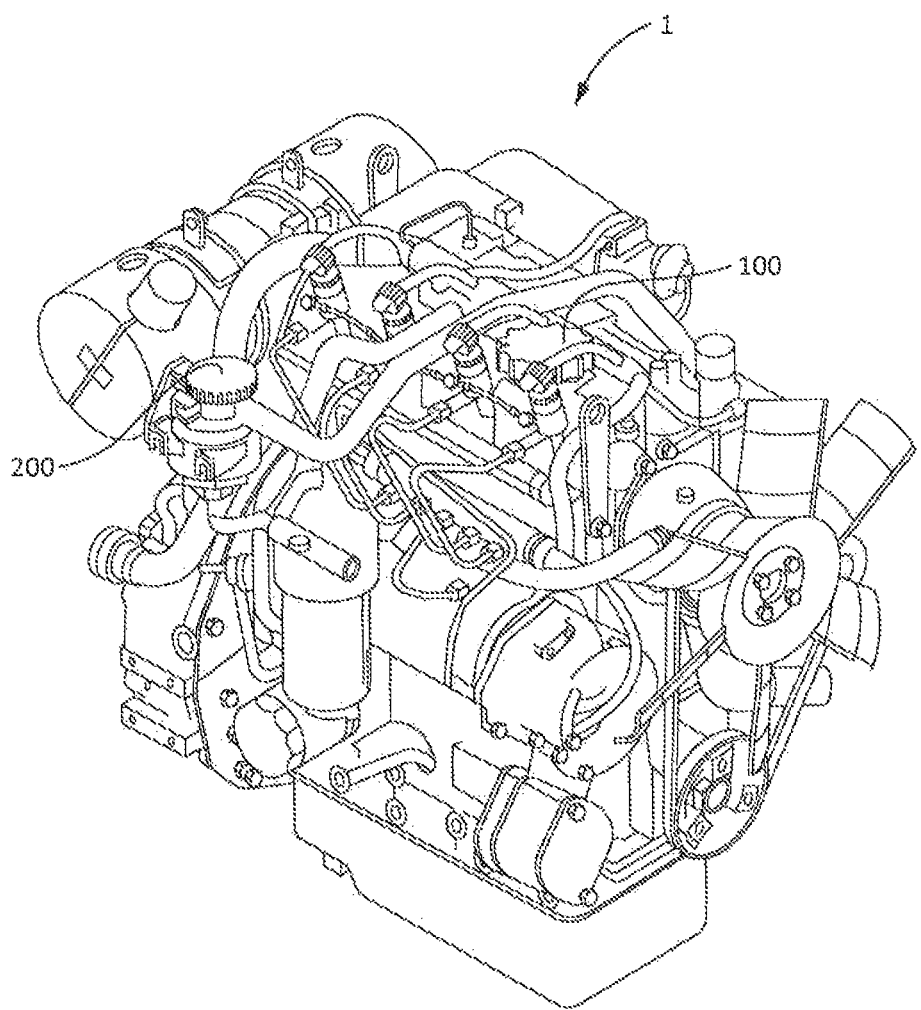
FIG. 11 shows an example of an internal combustion engine with local monitoring devices attached.

An example of an internal combustion engine 1 with local monitoring devices attached is shown in FIG. 11. As can be seen in FIG. 11, the smart breather filter assembly 200 and the smart engine oil filler cap 100 are attached to the internal combustion engine 1. Although only one of these smart devices may be used to perform the engine monitoring routine according to this disclosure, in some embodiments more than one type of local monitoring device may be attached to the internal combustion engine.

INDUSTRIAL APPLICABILITY

By providing a method of monitoring the usage of an internal combustion engine according to the present disclosure, engine usage data about an internal combustion engine may be gathered by a remote application. In particular, engine speed usage data may be determined from the aggregated summary generated by the local monitoring device. The data gathered by the local monitoring device is processed by the remote application, and so the method of monitoring according to the disclosure does not require any calibration or initial set up of the local monitoring device in order to be performed. Rather, the identification data relating to the local monitoring device and the type of internal combustion it is monitoring can be entered into a database for the remote application at a later date.

Advantageously, as the local monitoring device does not require any initial set up or calibration, it may be installed or retrofitted to a wide range of internal combustion engines including legacy internal combustion engines. For example, the local monitoring device may be provided as part a smart engine oil filler cap 100, a smart breather filter assembly 200, or a smart dipstick 300. Each of these parts are easily accessible and easily replaceable, meaning that old, standard engine oil filler caps/breather filter assemblies/engine oil dipsticks may be easily replaced with a local monitoring device for use with the method of the present disclosure.

The method according to the present disclosure may determine engine speed usage data by processing the measured firing frequencies using engine characterising data relating to the number of firing events per revolution of the internal combustion engine. By storing this data in a remote application, the storage and processing requirements of the local monitoring device may be reduced, which in turn means the local monitoring device may save space and or/power consumption.

The engine monitoring routine performed by the local monitoring device may be repeated over a period of time to generate an aggregated summary reflecting the cumulative usage of the internal combustion engine over the monitored period of time. Accordingly, the remote application may accumulate and monitor the usage of the internal combustion engine by tracking the updated aggregated summary over time.

The engine monitoring routine performed by the local monitoring device may include updating elements of the aggregated summary based on the determined frequency of the internal combustion engine. By updating the aggregated summary in this way, the amount of data recorded and stored by the local monitoring device is kept to a minimum, as opposed to logging each entry separately. By only updating a single element of the aggregated summary, power consumption may be further reduced, as opposed to writing the entire aggregated summary each time to the memory.

The local monitoring device according to the present disclosure may transmit/broadcast the aggregated summary and identification data to a remote application using, at least in part, a wireless network. By using a wireless network to transmit/broadcast the aggregated summary and identification information to the remote application, a wired connection to the local monitoring device may not be required. Furthermore, the local monitoring device may also be easily retrofitted to vehicles which do not have means for communicating with a remote application.

By gathering engine usage data on a remote server, the engine usage data may be accessible to a user at location away from the internal combustion engine being monitored. This may allow a company to monitor and or compare the usage of one or more internal combustion engines from a remote location.

Accordingly, a method of monitoring an internal combustion engine using a local monitoring device and a remote application is hereby disclosed. The methods according to this disclosure may be implemented on any type of internal combustion engine. For example the internal combustion engine may be provided in machinery such as a genset, a tractor, an excavator, a truck, a wheel loader, or a compactor. Accordingly, engine usage data relating to any of the above described machinery may also be determined based on the accumulated engine usage data provided by the method of monitoring according to this disclosure.

The invention claimed is:

1. A method of monitoring the usage of an internal combustion engine comprising:
    performing an engine monitoring routine using a local monitoring device attached to an internal combustion engine including:
        generating data representative of a plurality of vibrations of an internal combustion engine using a vibration sensor of the local monitoring device;
        processing the generated data to determine a first value representative of a firing frequency of the internal combustion engine;
        generating a plurality of data points representative of a crankcase pressure of the internal combustion engine using a pressure sensor of the local monitoring device;
        processing the data points to determine a second value representative of an average crankcase pressure of the internal combustion engine;
        generating an aggregated summary based on the first value; and
        transmitting the aggregated summary and identification data for the local monitoring device to a remote application,
    wherein the remote application processes the transmitted aggregated summary based on the identification data to determine engine speed usage data.

2. A method according to claim 1 wherein the remote application uses the identification data of the local monitoring device to determine the number of firing events per revolution of the internal combustion engine.

3. A method according to claim 1 wherein the engine monitoring routine is repeated at least once over a time period to generate engine usage data over the time period.

4. A method according to claim 3 wherein the local monitoring device generates the aggregated summary by updating an element of the aggregated summary based on the first value.

5. A method according to claim 4 wherein the element of the aggregated summary to be updated is updated by incrementing the element by an amount corresponding to the time elapsed following a previous performance of the engine monitoring routine.

6. A method according to claim 1 wherein transmitting the aggregated summary and the identification data from the local monitoring device to the remote application includes transmitting the aggregated summary and the identification data from the local monitoring device to a remote device over a wireless network.

7. A method, according to claim 1 wherein the remote application is executed on a remote device.

8. A method according to claim 1 wherein the first value is a dominant frequency of the vibrations.

9. A method according to claim 8 wherein the local monitoring device processing the generated data to determine a dominant frequency of the vibrations includes performing a time domain to frequency domain transformation on the generated data representative of a plurality of vibrations to generate a frequency response, wherein the frequency of the frequency response with the greatest magnitude within a predetermined frequency range is the dominant frequency.

10. A method according, to claim 1 including storing the aggregated summary in a memory of the local monitoring device.

11. A method according to claim 1 wherein the aggregated summary is generated based on, the first value and the second value.

12. A computer program comprising instructions to cause a local monitoring device and a remote device running a remote application to execute the steps of the method according to claims 1.

13. Computer-readable media having stored thereon the computer program according to claim 12.

14. The method according to claim 1, wherein the local monitoring device is an engine filler cap including:

the vibration sensor located in a filler cap body proximal to a crankcase of the internal combustion engine.

the pressure sensor located on an external surface of the filler cap body and exposed to the crankcase.

15. the method according to claim 1, wherein the local monitoring device is a breather filter including:

the vibration sensor contained within an electronics housing a differential pressure sensor contained within the electronics housing.

16. The method according to claim 1, wherein the local monitoring device is a dipstick including:

the vibration sensor located in an interior cavity;

a differential pressure sensor located in the interior cavity and in operative fluid communication with the atmosphere and a crankcase of the internal combustion engine.

\* \* \* \* \*